United States Patent Office 2,758,551
Patented Aug. 14, 1956

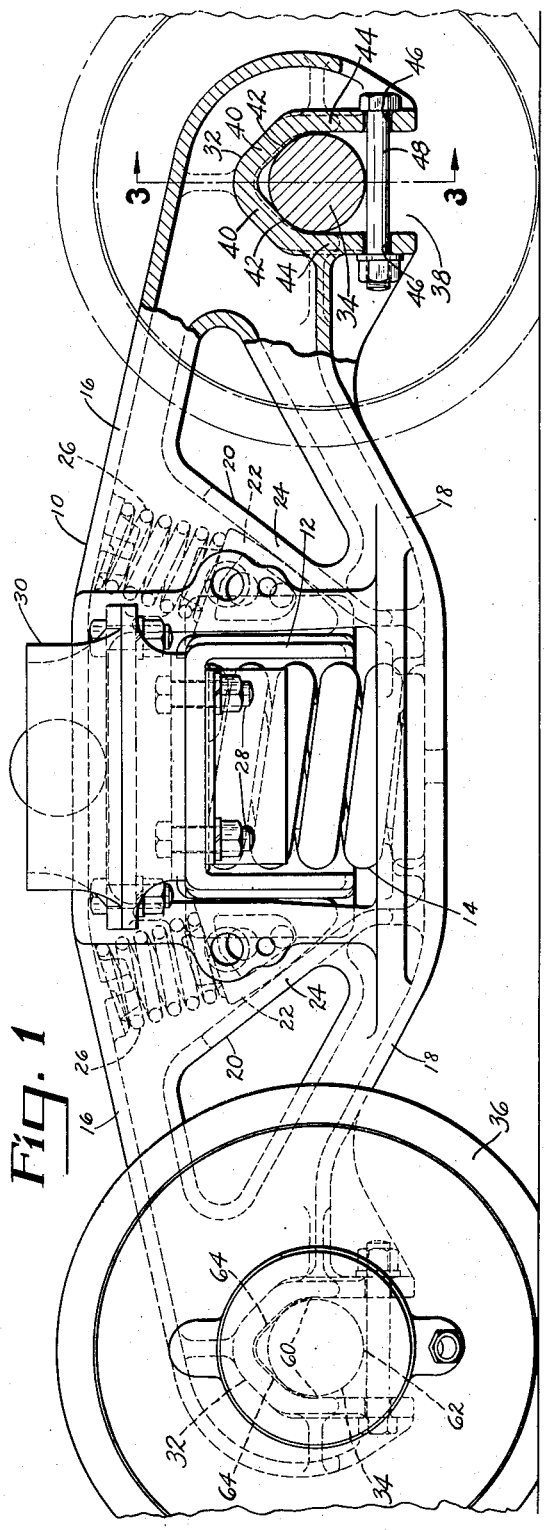
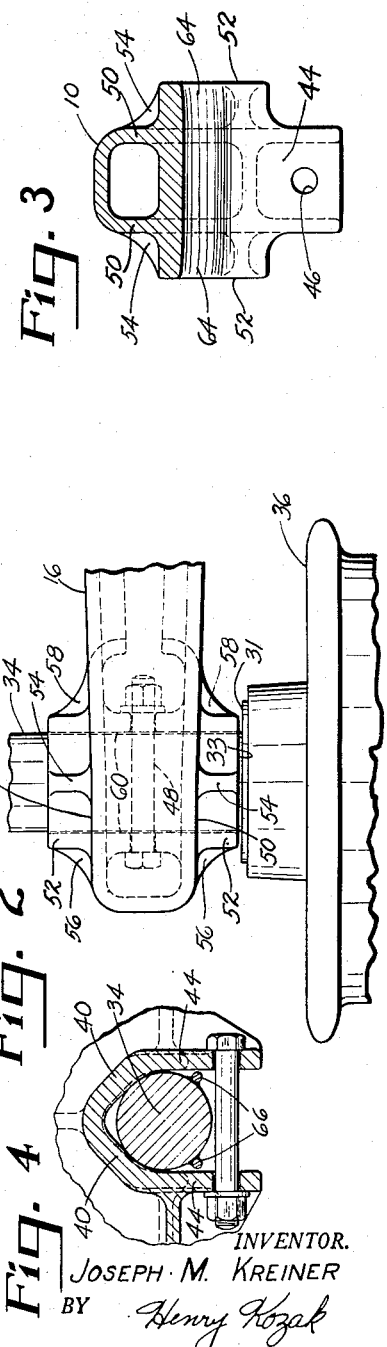

2,758,551

RAILWAY VEHICLE AXLE MOUNTING

Joseph M. Kreiner, Cleveland Heights, Ohio, assignor to National Malleable and Steel Castings Company, Cleveland, Ohio, a corporation of Ohio Application August 25, 1951, Serial No. 243,689

5 Claims. (Cl. 105—221)

This invention relates to axle mountings for railway vehicles, and more particularly to an axle mounting for mine or industrial cars.

In connection with the operation of mine cars, and also with cars used in certain industrial plants, there has been considerable failure of the anti-friction bearings employed in the wheels of these cars. This bearing failure has been caused by the end thrust forces acting against the dust ring of these bearings while the wheel axle is out-of-square with the axle mounting, in which position all of the thrust forces are transmitted to only a small portion of the dust ring thrust receiving surface, causing it to cock and destroy the bearing. The out-of-square movement of the axle has occurred in normal service and has been permitted by the axle mounting, either because of the initial fit of the axle in the mounting or because of wear.

My invention comprises a novel axle mounting, particularly adapted for mine or industrial cars which, in normal service, maintains the axle in square relation therewith yet has sufficient flexibility to allow limited restrained angling of the axle which may occur during passage of the car over track curvature of very small radius. While thus permitting limited out-of-square movement of the axles under abnormal track conditions, the mounting serves effectively to return the axles to square relation with the car when the latter returns to straight track. Moreover, the mounting maintains the axle square with the mounting regardless of any wear of the parts.

It is, therefore, an object of my invention to provide an axle mounting for mine or industrial cars which normally maintains the axle square with the mounting although it permits restrained angling of the axle, as may occur when the car passes over track of very small curvature and under such conditions provides a strong restoring force serving to return the axle to square position after the track causing such angling has been traversed.

A further object of my invention is to provide an axle mounting for a car truck for mine or industrial cars which effectively maintains the axles in square relation with the truck side frames and which, while allowing limited restrained horizontal angling of the axles, serves to return the axles into square relation with the frames, once the forces which cause the out-of-square movement cease to act.

Another object of my invention is to provide a simple and efficient axle mounting which assures proper alignment of the axle and firmly holds the axle in position, regardless of variations in manufacturing tolerances or of any wear of the parts.

Other objects and advantages of my invention will be apparent from the following description taken in conjunction with the drawings, in which:

Fig. 1 is a side elevational view, partly in section, of a car truck embodying the invention.

Fig. 2 is a plan view of one end of the car truck of Fig. 1 showing the axle mounting.

Fig. 3 is a sectional view taken along line 3—3 of Fig. 1, with the axle removed.

Fig. 4 is a fragmentary sectional view of a modification of the invention.

Referring to the drawings, there is shown a car truck comprising a side frame 10 and a bolster 12 supported on the frame by springs 14. The bolster extends transversely of the car truck and is connected to an identical side frame on the other side of the truck.

The side frame 10 comprises compression member 16, tension member 18, and connecting columns 20 forming a bolster-receiving opening therebetween. Each column 20 contains a pocket facing a side of the bolster for receiving a friction shoe 22 which bears against sloping wall 24 of the column and against a side of the bolster. A spring 26 reacting between the shoes and the top wall of the compression member maintains the shoes in operative position. The frictional engagement between shoes 22 and the sides of the bolster serves to control movement of the bolster to prevent any build-up of the oscillations of the bolster supporting springs 14 in service.

Mounted on the end of the bolster and secured thereto by means of bolts 28 is a side bearing assembly 30 of well known construction. At each end of the side frame, at the juncture of the compression and tension members, is the axle mounting 32 by means of which the car truck is supported on the axle 34 which, for purposes of illustration, is of the through-type. The wheel 36, mounted on the end of axle 34, is of the type which contains antifriction bearings and rotates with respect to the axle which is fixed.

It is customary to use a fixed axle in cars used in mines and in certain industrial plants, with the wheels mounted on the axle by means of roller bearings so as to rotate relative to the axle. Pressed or shrunk on the axle within the rear extremity of the wheel hub is a dust ring which has been shown in Fig. 2, as at 31. The rear inner cone of the roller bearing (not shown) presses against this dust ring and is held thereby in proper operating position. When severe lateral forces are transmitted from the rail through the wheel flange to the bearing assembly the dust ring 31 is forced into contact with the adjacent face, as at 33, of the axle mounting. When the thrust face of the dust ring and the opposing face 33 of the mounting are parallel, this thrust is evenly distributed to the antifriction bearing assembly and is not harmful. Experience has shown, however, that if the axle mounting is so designed that the axle can get out-of-square relative thereto, the thrust forces are transmitted to one side only of the dust ring, tending to cock the ring and destroy the anti-friction bearing. The design of previously used axle mountings has allowed this condition to exist, either because of initial fit of the axle in the mounting or because of wear, and bearing failure has become a serious matter.

In accordance with my invention, axle mounting 32 is formed with a downwardly opening recess 38 for receiving axle 34 and comprises an inverted V-shaped bearing portion having a pair of upwardly converging transversely extending walls 40 which are in straddled engagement with the axle as at 42, 42. Extending downwardly from the ends of wall 40 are guide walls 44 which are provided with openings 46 for receiving a retaining bolt 48 underlying the axle and precluding disengagement of the axle from the car truck. Walls 40 and the portions of guide walls 44 which are immediately adjacent the axle are extended laterally beyond the side walls 50 of the side frame as at 52 to provide for greater stability of the mounting. These extensions are reinforced by vertical ribs 54 and by horizontal ribs 56 and 58.

It will be clear that the straddled engagement 42, 42 between converging walls 40 and the axle will position the latter square with the side frame so that the thrust face of ring 31 will remain parallel to the opposing face 33 of the mounting. Moreover, with the total weight of the car directed to points 42, 42 which actually represent line contacts between the mounting and the axle, the axle is effectively maintained in square relation with the frame. If, however, due to extreme operating conditions, the forces are such as to require the axles to angle horizontally, as when the car travels along curves of very small radius, the mounting permits such angling through the provision of a small amount of clearance between guide walls 44 and the sides of the axle, as at 60, and between retaining bolt 48 and the bottom of the axle, as at 62. Thus, if the forces tending to angle the axle out-of-square with the frame are sufficient to cause the axle mounting to rise with respect to the axle against the weight of the car, then the axle may angle horizontally within the limits allowed by the aforementioned clearances. However, upon the cessation of the unsquaring forces, the axle will be immediately returned into square relation with the side frame by the wedging action between walls 40 and the axle.

It will also be clear that the straddled engagement between walls 40 of the mounting and the axle serves to hold the latter firmly as well as square with respect to the side frame independent of the spacing of guide walls 44 of opening 38. Thus, regardless of variations in the spacing of walls 44 resulting from manufacturing tolerances, the axle will be held in proper alignment. While it is preferred to maintain only a slight clearance, as at 60, between the axle and walls 44 so as to allow limited angling of the axle under abnormal operating conditions, the amount of this clearance in nowise affects the squaring properties of the mounting.

It will also be apparent that the squaring action is independent of any wear between the axle and the mounting. The axles will therefore be maintained square with the mountings throughout the service life of the car.

The inner surfaces of extensions 52 which form continuations of the inner surfaces of converging walls 40 are flared, as at 64, to facilitate angling of the axle in a vertical direction, such as caused by uneven track conditions.

In Fig. 4 the construction of the axle mounting is identical with that shown in the previous figures but provision is made for precluding possible rotational creeping of the axle relative to the mounting in service. To this end lugs 66 of suitable size are welded to the axle adjacent guide walls 44. If desired only one lug can be applied to each end of the axle on diagonally opposite sides thereof.

It will be understood that while my improved axle mounting has been shown as applied to a car truck, it is equally applicable to a car of the four wheel type in which through axles are mounted in housings which are directly connected to the car frame. In such a case the axle mounting is provided in the housing and functions in identical manner, as in the present embodiment, to maintain the axle in square relation with the car.

Furthermore, the mounting is applicable for use with stub-type axles instead of through-axles as shown herein. In such case each end of each stub axle is received in a mounting similar to that shown herein and the axle is maintained square in relation to the mountings in the same manner.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a railway car truck of the four-wheel type in which the wheels are mounted for independent rotation on fixed axles, a side frame comprising tension and compression members converging toward the ends of the frame, and axle receiving mounting at each end of the frame at the juncture of said tension and compression members, said mounting comprising integral upwardly converging transversely extending walls having substantially flat surfaces for straddled engagement directly with said axles for maintaining said frame and axles in square relationship.

2. A railway car truck comprising a side frame, a bolster resiliently supported on said frame, said frame having at each end thereof an axle-receiving recess open at the bottom, said frame having a pair of upwardly converging substantially flat walls in the upper end of each recess, said walls extending transversely of said frame, and axle received in each recess and being in direct engagement with said walls for maintaining said frame and axle in square relationship, and an anti-friction bearing containing wheel mounted on the end of said axle outboard of said frame.

3. A railway car truck having a pair of transversely spaced side frames, a bolster extending between and resiliently supported on said frames, each of said frames having at its ends a transversely extending axle-receiving recess open at the bottom, said frame having a pair of upwardly converging substantially flat walls in the upper end of each recess, a pair of axles extending between the ends of said frames and received in said recesses, said axles being in direct engagement with said walls to maintain said frames in square relationship with the axles, and antifriction bearing containing wheels mounted on the ends of said axles, outboard of said frames.

4. A railway car truck comprising a side frame, a bolster mounted on said frame, said frame having an axle mounting at each end thereof, said mountings comprising upwardly converging substantially flat walls, an axle received in direct straddled engagement with said walls in each of said mountings to normally maintain the axle and frame in square relationship, an anti-friction bearing containing wheel mounted on the end of each of said axles outboard of said frame, and guide means depending from said walls from below said axle engaging sections of the walls, said means being spaced apart so as to have at least slight clearance between said axles and said means so as to allow limited horizontal angling of the axles if the latter are momentarily forced out of square relationship with said frame.

5. A railway car truck in accordance with claim 2 wherein said axle engaging walls are formed integrally with said frame and extend laterally a substantial amount from both sides of said frame ends.

References Cited in the file of this patent

UNITED STATES PATENTS

| | | |
|---|---|---|
| 531,405 | Betterman | Dec. 25, 1894 |
| 1,159,510 | Lietz | Nov. 9, 1915 |
| 1,748,209 | Couch | Feb. 25, 1930 |
| 1,937,618 | Willoughby | Dec. 5, 1933 |
| 1,962,723 | Pancake | June 12, 1934 |
| 2,014,725 | Field | Sept. 17, 1935 |
| 2,056,654 | Edmunds | Oct. 6, 1936 |
| 2,140,038 | Watts | Dec. 13, 1938 |
| 2,287,575 | Sensenich | June 23, 1942 |
| 2,352,693 | Davidson | July 4, 1944 |
| 2,458,210 | Schlegel | Jan. 4, 1949 |

FOREIGN PATENTS

| | | |
|---|---|---|
| 47,729 | Germany | July 4, 1889 |
| 423,085 | Great Britain | Jan. 24, 1935 |
| 426,999 | Germany | Oct. 30, 1926 |